Figure 1:
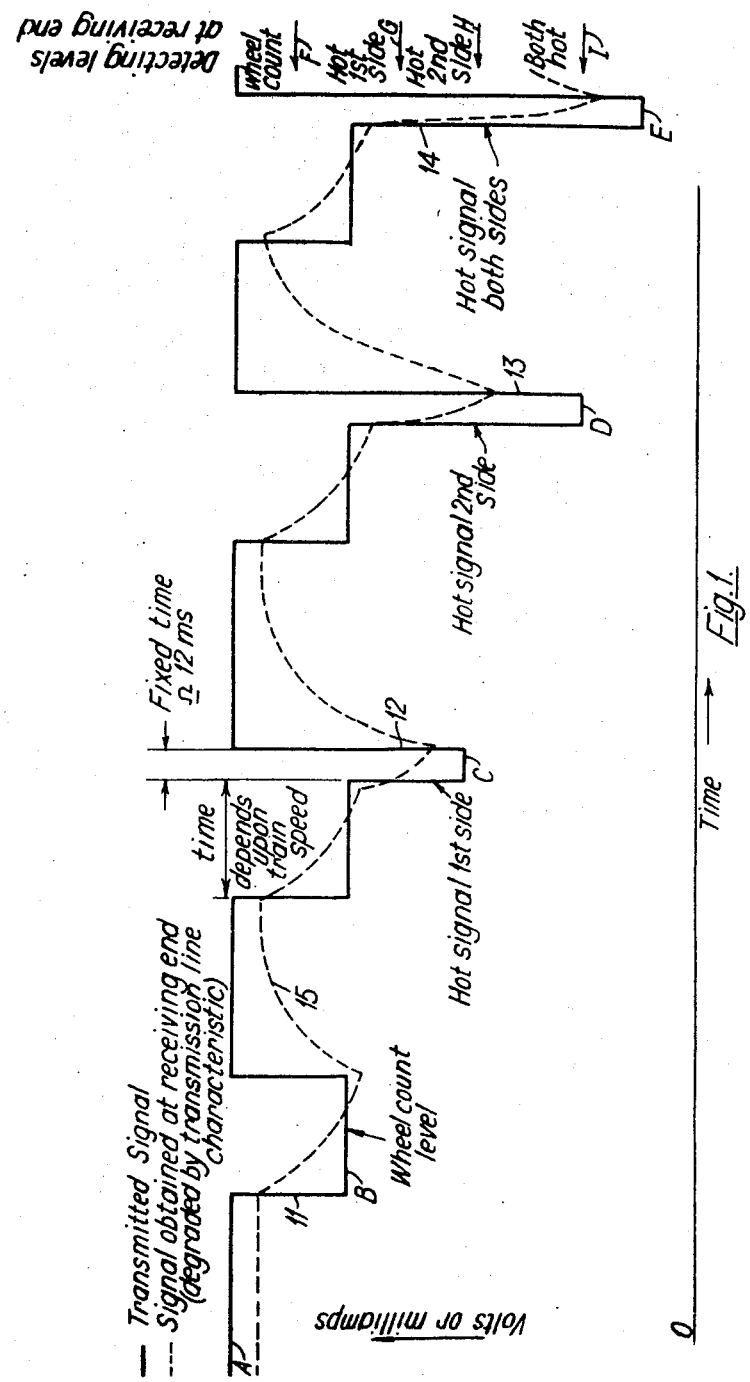

United States Patent
Thompson

[15] 3,700,888
[45] Oct. 24, 1972

[54] INFORMATION TRANSMISSION

[72] Inventor: Lionel Raymond Frank Thompson, Hatfield, England

[73] Assignee: Hawker Siddeley Dynamics Limited, Hatfield, England

[22] Filed: Dec. 4, 1970

[21] Appl. No.: 95,116

Related U.S. Application Data

[63] Continuation-in-part of Ser. No. 766,569, Oct. 10, 1968, abandoned.

[30] Foreign Application Priority Data

Oct. 10, 1967  Great Britain..........46,249/67

[52] U.S. Cl. ..............................246/169 D, 340/169
[51] Int. Cl. ................................................B61k 9/06
[58] Field of Search .246/169 D; 340/147 PC, 167 R, 340/169, 172, 203

[56] References Cited

UNITED STATES PATENTS

| | | | |
|---|---|---|---|
| 2,753,546 | 7/1956 | Knowles | 340/203 X |
| 3,028,484 | 3/1962 | Gallagher | 246/169 D |

*Primary Examiner*—Gerald M. Forlenza
*Assistant Examiner*—George H. Libman
*Attorney*—Dowell & Dowell

[57] ABSTRACT

An electrical signal transmission system, applicable to the transmission of signals from trackside hot box detector equipment for railroad locomotives and rolling stock, wherein a basic pulse train is transmitted whereof the pulses are of a selected first amplitude and represent a train axle count, and a spike pulse of greater selected amplitude is transmitted, occurring immediately after the axle count pulse to which it relates, whenever an overheated axle box is detected. To enable the signal receiving equipment to determine on which side of a train the overheated box is located, the spike pulses are of two different amplitudes corresponding, respectively, to opposite sides of the train.

7 Claims, 2 Drawing Figures

INFORMATION TRANSMISSION

This invention relates to information transmission and especially the transmission of signal data from railway track-side equipments to signal boxes or other control stations. The present application is a continuation-in-part of my application Ser. No. 766,569, filed Oct. 10, 1968 and now abandoned.

One instance in which transmission of signal data as aforesaid is necessary is in relation to the detection of overheated axle boxes on railway locomotives and rolling stock. Trackside equipment is set up to scan the passing axle boxes and the information obtained, in respect of each wheel pair, may comprise signals representative of axle box temperatures at both ends of the axle and a further signal giving an axle count so that individual axles can be identified in the signal read out. At present, this information is transmitted unmodified from the trackside equipment to the signal box but this requires a transmission channel of considerable band width. Moreover, the disadvantages of transmitting the unmodified signal data become greater as the transmission distance increases, due to the inevitable degradation of the signals, and this is a problem that must be met in view of plans to reduce the number of signal boxes to a comparatively few master control boxes supervising a great many miles of track.

It is therefore an object of the invention to provide a scheme for transforming the information signals at the track-side so as to create a signal waveform for transmission that achieves a considerable improvement over previous practice.

According to the present invention, the waveform transmitted comprises a standing d.c. level, pulses of a first amplitude to represent the axle count, pulses of a second and greater amplitude each to indicate a hot axle box on one side, and pulses of a third and still greater amplitude each to indicate a hot box on the opposite side. If desired, pulses of a fourth and yet greater amplitude can be utilized each to indicate that the two axle boxes on opposite sides are both hot but this will be such a rare occurrence that it may be considered an unnecessary provision. The pulses may be either voltage or current pulses.

Transmission of this type of signal pulse train requires only a narrow band width, say 30 cycles, and it only needs two transmission conductors instead of the three employed hitherto. The received signal is easy to interpret by means of simple gating circuits and transmission over many miles can be effected without the resultant progressive pulse distortion or degradation in the conductors reaching a degree at which the signal is no longer reliably comprehensible to the decoding circuitry.

Figure 2:
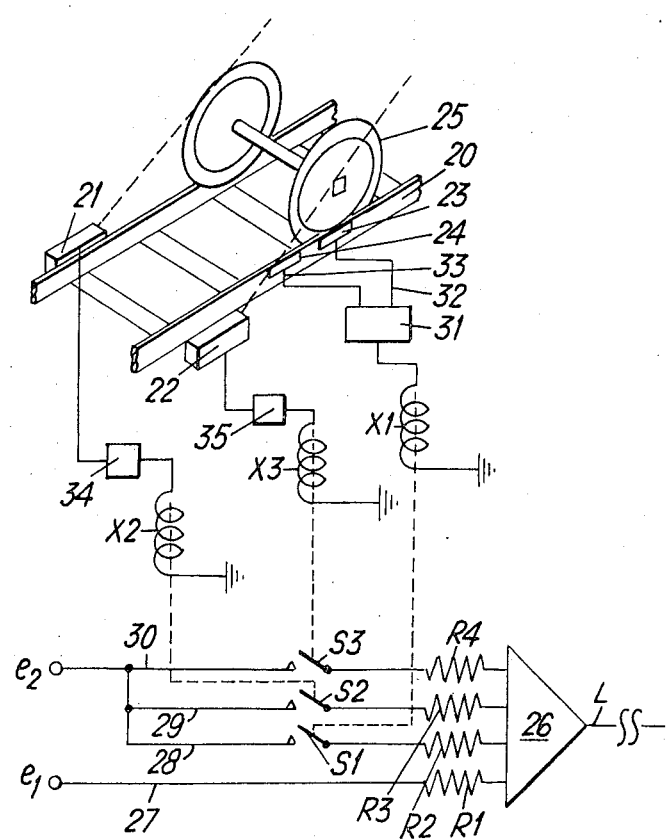

One way of carrying the invention into effect will now be described by way of example, with reference to the accompanying drawings, in which:

FIG. 1 is a diagram of waveforms illustrating the technique according to the invention, and FIG. 2 is a block diagram of apparatus and circuitry for producing these waveforms.

Referring firstly to FIG. 1, the standing d.c. level, which is the normal level in volts or milliamps, of the live line of the system, is represented at A. The level transmitted during an axle count is indicated at B, the count signal while a train is passing consisting of a succession of square pulses 11 each of amplitude A-B and each representing an axle, i.e., a pair of wheels. If the temperature of all the axle boxes is normal the count pulse train alone is transmitted. In the case of an overheated axle box the count pulse 11 appertaining to that axle is immediately followed by a narrow pulse or spike of greater amplitude, with the amplitude of the spike indicating the side of the train on which the overheated box is located. The narrow spike always appears at a predetermined time relationship to the count pulse for the axle with the overheated box.

The level C represents an overheated box on one side and the level D an overheated box on the other side. The decoding circuitry therefore determines that side of the train on which the overheated box is to be found according to whether a spike 12 of amplitude A-C or a spike 13 of amplitude A-D is received. A further level E is transmitted if the two axle boxes on opposite sides of the train are both overheated, giving a spike 14 of amplitude A-E. Whereas the frequency of occurrence and time duration of the count pulses 11 is dependent on train speed, the time width of any spike pulse 12, 13, 14 following a count pulse 11 is a fixed period of, say 12 milliseconds, independent of train speed.

The detecting levels of the decoding circuitry at the receiving end are indicated at F, G, H and I. A pulse of amplitude greater than A-F indicates an axle count. A pulse of amplitude greater than A-G but not greater than A-H indicates an overheated axle box on one side of the train. A pulse of amplitude greater than A-H but not greater than A-I indicates an overheated axle box on the other side of the train. And a pulse of amplitude greater than A-I indicates hot axle boxes on both sides. The broken line waveform 15 shows how the signal may be received after degradation in the transmission lines and the detecting levels of the decoding circuitry are chosen so that effective decoding can still be accomplished after such degradation.

Transient noise spikes may appear in the waveform during its transmission and it is possible to discriminate against these by employing the passage of the waveform through the detection level to trigger a delay circuit that produces a strobe pulse, say, 6 milliseconds later. To be recognized as a true signal the waveform must still be beyond the detection level at the occurrence of the strobe pulse, since after a 6 milliseconds delay a transient spike due to noise will ordinarily have disappeared. On the other hand, this sets up a limit to the length of the transmission lines in that the signal degradation cannot be allowed to proceed to a point where the signal spikes 12, 13, 14 are narrower than 6 milliseconds at the respective levels G, H and I.

In general, such a scheme will enable the information to be transmitted over an ordinary pair of electrical conductor wires up to 10 miles. High grade wires will increase this distance, to, say, 20 to 30 miles and the use of telephone cable can raise the distance up to, say, 60 or 70 miles.

The track-side circuitry required to create the signal waveform for transmission can readily be built up from conventional amplifiers and scaling circuits.

Referring now to FIG. 2 of the drawings, this illustrates one simple arrangement whereby the waveforms of FIG. 1 can be produced, although it will be understood that this is merely one possible apparatus and other arrangements will occur to those skilled in the art, so that it is not intended that the scope of the invention should be limited to the particular apparatus or circuitry shown in FIG. 2. In the employment of hot axle box detectors as conventional hitherto, the equipment mounted upon or alongside the railroad track comprises two detectors disposed at opposite sides of the track, to monitor simultaneously the temperatures of the two axle boxes at opposite ends of the same axle, this monitoring operation being repeated for each axle of each passing railcar. Also, track-mounted wheel trips or proximity switches are provided to signal the approach into the monitoring region of each axle and wheel pair, and to signal also its departure from the monitoring region. Thus, in FIG. 2 the track 20 has hot box detector units 21, 22 disposed alongside it at opposite sides on a pair, and two wheel trips or proximity switches 23, 24 mounted one beyond the other on one of the two running rails to sense the passage of each wheel 25. It will be understood that this is a well known prior arrangement and nothing new.

To practice the present invention it is necessary to transmit to the transmission line L a signal waveform having the characteristics shown in FIG. 1. This is very simply done by providing an amplifier 26 feeding the transmission line L, this amplifier having a plurality of inputs controlled by the wheel trips 23, 24 and by the outputs of the hot box detectors 21, 22. To this end, the amplifier 26 sums four inputs applied via respective resistors R1, R2, R3 and R4. The input of voltage $e_1$ applied on line 27 via the resistor R1 is a permanent unswitched standing D.C. level. The other three inputs, applying voltage $e_2$ to the amplifier 26 upon input lines 28, 29 and 30 via respective switches S1, S2, S3 and respective resistors R2, R3, R4, are switched inputs only operative when an axle and wheel pair are passing through the monitoring region.

Switch 51 is operated by a relay X1 energized by the output of a bistable multivibrator or flip-flop 31 which has a set line input 32 connected to the first wheel trip 23 to be reached by the wheel 25, and a reset line input 33 connected to the following wheel trip 24. This means that the switch S1 is closed, and thereby adds the input on line 28 to the input on line 27, for the period that it takes the wheel 25 to progress from the first wheel trip 23 to the second wheel trip 24. Closure of the switch S1 brings the output of the amplifier 26 on line L from the standing level A in FIG. 1 to the wheel count level B; and clearly the period of duration of the wheel count pulse is determined by the time taken for the wheel to pass from the wheel trip 23 to the wheel trip 24 and therefore by the speed of the train.

If neither of the two hot box detectors 21, 22 is delivering an alarm output indicative of sensing of an overheated axle box, then relays X2, X3 controlling switches S2, S3 are not energized and so these switches remain open and the only pulse transmitted is the wheel count pulse just described. However, if either of the hot box detectors 21, 22 is sensing the passage of an overheated axle box then its alarm signal is transmitted to a respective monostable circuit 34 or 35 which is thereby triggered to deliver an energizing output to the respective relay X2 or X3 to close the respective switch S1 or S2 and thereby add the input on either the line 29 or the line 30 to the standing level input on the line 27.

And, of course, if both box detectors are sensing overheated axle boxes at both ends of the axle then both switches S2 and S3 will be closed and both inputs on lines 29 and 30 will be applied to the amplifier 26.

By appropriate choice of the values of the two resistors R3 and R4, it can be made that the signal appearing to be summed at the amplifier input from line 30 when the switch S3 is closed is much larger than, say about twice as large as, the signal appearing at the amplifier input from line 29 when switch S2 is closed. Thereby an overheated axle box at levels, side of the train will give the hot signal of amplitude C in FIG. 1 and an overheated axle box at the other side of the train will be denoted by a hot signal of the higher amplitude D. And, of course, if both switches S2 and S3 are closed, an even higher hot signal level, that is the amplitude E in FIG. 1 will appear. The width or time period of each hot box pulse is determined by the time delay before the output of the triggered monostable circuit 34 or 35 disappears. This period can be made quite short in comparison to the duration of the wheel count pulse. Also, by appropriately siting the hot box detectors 21, 22 along the track in relation to the wheel trip positions 23, 24, the hot box signals may be made to occur following immediately at the end of the wheel count pulse. Therefore, there is achieved the waveform in FIG. 1 in which, in the case of sensing of an overheated axle box, a narrow signal spike of greater amplitude follows immediately after the wheel count pulse, and the amplitude of this hot signal spike will be one of three levels, greater than the wheel count level, denoting, respectively, an overheated axle box at one side of the train, an overheated box at the other side, or overheated boxes at both ends of the same axle.

I claim:

1. A method of electrical transmission for signals representing the heat condition of axle boxes on railway locomotives and rolling stock, comprising the steps of transmitting over a long-distance transmission line first electrical signal pulses of a first fixed predetermined amplitude each representing the passage of a wheel axle of a train; transmitting over said same transmission line second electrical signal pulses of a second and greater fixed predetermined amplitude each indicating an overheated axle box on one side of the train, said second signal pulses being transmitted in predetermined time relationship to said first signal pulses; and transmitting also over said same transmission line third electrical signal pulses of a third and still greater fixed predetermined amplitude each indicating an overheated axle box on the opposite side of the train, said third signal pulses being likewise transmitted in predetermined time relationship to said first signal pulses.

2. A method according to claim 1, comprising the further step of transmitting over said same transmission line fourth electrical signal pulses of a fourth and yet greater fixed predetermined amplitude each indicating that the two axle boxes at opposite ends of the same axle are both overheated, said fourth signal pulses also being transmitted in predetermined time relationship to said first signal pulses.

3. A method according to claim 1, wherein each of said second and third signal pulses occurs immediately following that one of said first signal pulses to which it relates.

4. A method according to claim 3, wherein said first signal pulses are comparatively broad and said second and third signal pulses are comparatively narrow.

5. A method according to claim 1, wherein the frequency of occurrence and time duration of said first signal pulses varies with train speed, and said second and third signal pulses are of fixed time duration.

6. A method of electrical transmission for signals representing the heat condition of axle boxes on railway locomotives and rolling stock, comprising the steps of transmitting over a long-distance transmission line first electrical signal pulses of a fixed predetermined value each representing the passage of a wheel axle of a train; transmitting over said same transmission line second electrical signal pulses of a second and different fixed predetermined value each indicating an overheated axle box on one side of the train, said second signal pulses being transmitted in predetermined time relationship to said first signal pulses; and transmitting also over said same transmission line third electrical signal pulses of a third and still different fixed predetermined value each indicating an overheated axle box on the opposite side of the train, said third signal pulses being likewise transmitted in predetermined time relationship to said first signal pulses.

7. A method according to claim 6, comprising the further step of transmitting over said same transmission line fourth electrical signal pulses of a fourth and yet again different predetermined value each indicating that the two axle boxes at opposite ends of the same axle are both overheated, said fourth signal pulses also being transmitted in predetermined time relationship to said first signal pulses.

* * * * *